(12) United States Patent
Herman

(10) Patent No.: US 6,845,951 B2
(45) Date of Patent: Jan. 25, 2005

(54) METHOD OF CONTROLLING POINTING FOR A FLEXIBLE STRUCTURE

(75) Inventor: Paul Andrew Herman, Hermosa Beach, CA (US)

(73) Assignee: The Aerospace Corporation, El Segundo, CA (US)

(*) Notice: Subject to any disclaimer, the term of this patent is extended or adjusted under 35 U.S.C. 154(b) by 0 days.

(21) Appl. No.: 10/118,705

(22) Filed: Apr. 8, 2002

(65) Prior Publication Data

US 2003/0189137 A1 Oct. 9, 2003

(51) Int. Cl.⁷ .............................................. B22C 13/04
(52) U.S. Cl. ........................ 244/164; 701/1; 701/4; 701/42; 701/300; 318/561
(58) Field of Search ........................ 244/164; 701/1, 701/4, 42, 300; 318/561, 560, 562

(56) References Cited

U.S. PATENT DOCUMENTS

| | | | |
|---|---|---|---|
| 4,916,635 A | | 4/1990 | Singer et al. ............... 364/513 |
| 5,012,171 A | * | 4/1991 | Sember ....................... 318/696 |
| 5,465,035 A | | 11/1995 | Scaramuzzo, Jr. et al. .. 318/561 |
| 5,469,414 A | * | 11/1995 | Okamura ................. 360/78.06 |
| 6,505,085 B1 | * | 1/2003 | Tuttle et al. .................. 700/28 |

* cited by examiner

*Primary Examiner*—J. Woodrow Eldred
(74) *Attorney, Agent, or Firm*—Henricks, Slavin & Holmes LLP

(57) ABSTRACT

A method of controlling pointing for a flexible structure such as a satellite includes: providing feedforward and reference inputs of a pointing control system with prefilters; and scheduling the prefilters and a bang-bang input to the pointing control system as a function of a desired input.

20 Claims, 4 Drawing Sheets

$$G_p(s) = \frac{1}{Js^2} + \frac{\eta_o}{(s^2 + 2\xi_o\omega_o s + \omega_o^2)}$$

where $$-\alpha \le \eta_o \le \alpha$$

$$-\beta \le \omega_o \le \beta$$

$$-\psi \le J \le \psi$$

$$G_p(s) = \frac{1}{Js^2} + \frac{\eta_o}{(s^2 + 2\xi_o\omega_o s + \omega_o^2)}$$

*where*

$-\alpha \leq \eta_o \leq \alpha$
$-\beta \leq \omega_o \leq \beta$
$-\psi \leq J \leq \psi$

METHOD OF CONTROLLING POINTING FOR A FLEXIBLE STRUCTURE

BACKGROUND OF THE INVENTION

A common task for a satellite is to slew and point at a target within a specific tolerance. In the past, these tasks have frequently been accomplished using heritage Proportional/Integral/Derivative (PID) control laws. Currently, numerous satellites are being designed to be lighter than their predecessors. The reason for removing mass is to allow the use of smaller, less costly launch vehicles. Unfortunately, there is a technical cost associated with the reduced weight. Lighter satellites are flexible and therefore difficult to control, e.g., pointing accurately and quickly from one point to another. More specifically, it would be useful to be able to slew and settle a light flexible satellite with the precision of it's stiffer predecessor. Thus, there is a need for a controller design capable of providing enhanced pointing performance while avoiding costly hardware redesigns.

SUMMARY OF THE INVENTION

Universal Bang-Bang Control (UBBC) according to the present invention is designed to solve the problem of pointing flexible satellites accurately and quickly from one point to another. An exemplary implementation of the present invention takes the form of a high performance tracking controller for lightly damped highly flexible satellites. However, it should be appreciated that the principles of the present invention are applicable to any "point to point" input tracking problem involving flexible dynamics and to any type of system or structure (e.g., satellites, hard-drives, manufacturing, robotics, and machine tools) where it is desirable to be able to point quickly and accurately.

A method of controlling pointing for a flexible structure according to the present invention allows for faster and more accurate pointing over existing techniques such as "haversine commanding" where the slew angle defines the frequency content. Generally, the method of the present invention pertains to employing scheduled scaled bang-bang command generation in conjunction with a scheduled prefilter scheme such as shown in FIG. 2. In one embodiment, a command generator is configured to generate a scaled bang-bang input based on system capabilities and input magnitude. The prefilters filter the bang-bang input before it enters into the system such that the modes associated with the flexibility of the structure under control are not excited. These filters are designed such that they attenuate energy spectra that would excite the undesirable modes of the system. In one embodiment, the prefilters are configured within a closed loop control system as shown in FIG. 2 and described below:

$$F_i(s) = \frac{\prod_{i=1}^{l}(s/c_i + 1)}{\prod_{i=1}^{k}(s/d_i + 1)}.$$

In one embodiment, the filters are purely low pass, identical (i.e., F1=F2), and second order. In one embodiment, the pole locations are derived directly from the lowest frequency mode present in the dynamics of the structure to be controller. By way of example, this is 50% of this mode frequency resulting in an attenuation of −40 db/dec.

Referring again to FIG. 2, the bang-bang command is utilized in the reference path and the feedforward path after being filtered by the respective prefilters. In one embodiment, the pole and zero locations of the prefilter and the bang-bang profile specifics are scheduled as a function of the magnitude of the input to be tracked, $\theta$.

In accordance with an embodiment of the present invention, a method of controlling pointing for a flexible structure includes: providing feedforward and reference inputs of a pointing control system with prefilters; and scheduling the prefilters and a bang-bang input to the pointing control system as a function of a desired input. In one embodiment, the prefilters filter the bang-bang input such that modes associated with flexibility of the structure are not excited. In one embodiment, a pole location of the prefilters is derived from a lowest frequency mode present in dynamics of the structure. In one embodiment, the prefilters are tailored for subsets of a total operating range. In one embodiment, the prefilters shape the frequency content of the bang-bang input. In one embodiment, the prefilters bandwidth limit spectral content of the bang-bang input. In one embodiment, the prefilters are low pass. In one embodiment, the prefilters are modified as a function of a commanded slew angle $\theta$. In one embodiment, the prefilters are scheduled as a function of a commanded slew angle $\theta$. In one embodiment, pole and zero locations of the prefilters and bang-bang profile specifics are scheduled as a function of a magnitude of an input to be tracked and/or plant dynamics. In one embodiment, the bang-bang input is scaled based on system capabilities and a magnitude of an input to be tracked.

In accordance with another embodiment of the present invention, a method of controlling pointing for a flexible structure includes: providing a closed loop control system with feedforward and reference paths; and providing, to the feedforward and reference paths, inputs that have spectral content distributed over a closed loop bandwidth of the system. In one embodiment, the inputs are attenuated at higher frequencies. In one embodiment, each path includes a prefilter.

In accordance with another embodiment of the present invention, a method of controlling pointing for a flexible structure includes: providing a closed loop control system to a flexible structure; and providing, to the closed loop control system, an acceleration command, R(t), which is a function of a maximum angular velocity $\omega_M$, a maximum angular acceleration $\alpha_M$, and a slew angle $\theta$. In one embodiment, the maximum angular velocity $\omega_M$ changes as a function of the slew angle $\theta$. In one embodiment, R(t) is defined such that when integrated twice it converges to a commanded angle.

In accordance with another embodiment of the present invention, a method of controlling pointing for a flexible structure includes: providing a closed loop control system of a flexible structure; and providing, to the closed loop control system, a bang-bang acceleration input that takes into account uncertainty related to plant dynamics.

In accordance with another embodiment of the present invention, a method of controlling pointing for a flexible structure includes providing a pointing controller designed to receive bang-bang inputs and to take uncertainty related to ignorance of plant dynamics into account.

In accordance with another embodiment of the present invention, a method of controlling pointing for a flexible satellite includes providing a satellite pointing controller designed in consideration of modeling uncertainty. In one embodiment, the controller is designed based on Qualitative Feedback Theory (QFT). In one embodiment, the controller is designed in consideration of a performance specification. In one embodiment, the controller is designed in consideration of plant dynamics.

The above described and other features and advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION

The following is a detailed description of the best presently known mode of carrying out the invention. This description is not to be taken in a limiting sense, but is made merely for the purpose of illustrating the general principles of the invention.

An exemplary controller according to the present invention is designed based on Quantitative Feedback Theory (QFT) with no restrictions on controller form. This technique incorporates modeling uncertainty into the design process allowing for the use of less conservative gain and phase margins. An exemplary controller according to the present invention is determined by plant dynamics and modeling uncertainty.

Figure 1:
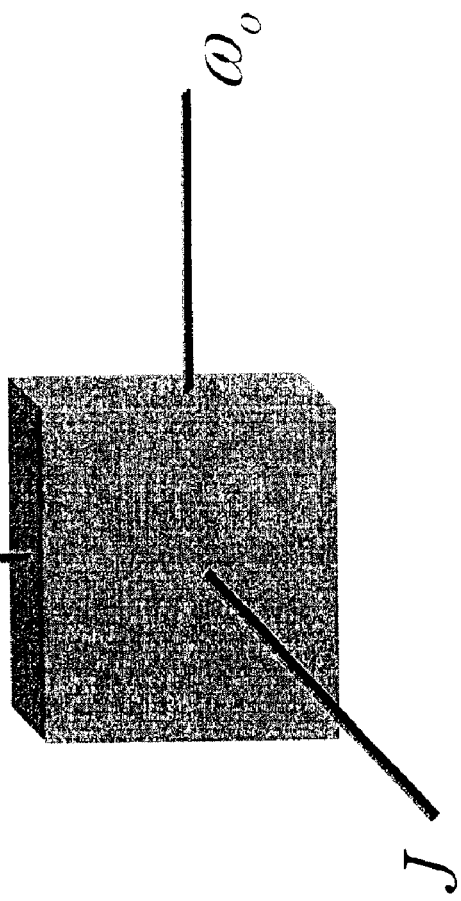
FIG. 1 illustrates an example of modeling parameter uncertainty according to the present invention.

FIG. 1 illustrates how a linear model can be used to capture both uncertainty in modeling and possible non-linearities in the system (in this case a satellite). For demonstration purposes, three parameters are chosen and each is allowed to be varied between a range of values. This scheme requires the controller being designed to work for any possible combination of parameter values. In other words, a family of linear models is formulated to bound the behavior of a non-linear and uncertain system.

The resulting controller is a function of the performance specifications, plant dynamics, and modeling uncertainty. Presentations of QFT based design techniques are set forth in: I. Horowitz, 1972, "Synthesis of Feedback Systems with Large Plant Ignorance for Prescribed Time-Domain Tolerances", *Int. J. Control*, Vol. 16, No. 2, pp. 287–309; Jayasuriya, S. and Franchek, M. A., "Loop Shaping for Robust Performance in Systems with Structured Perturbations", *Proceedings of the ASME Winter Annual Meeting, Chicago*, Ill., 1988; and Franchek, M. A., and Herman, P. A., 1998, "Direct Connection Between Time Domain Performance and Frequency Domain Characteristics", *International Journal of Robust Nonlinear Control*, pp. 1021–1042 (all incorporated herein by reference). Additionally, a valuable resource for frequency domain based controller design is: Bode, H. W. 1945, *Network Analysis and Feedback Amplifier Design*, Van Nostrand Company, New York (incorporated herein by reference).

Figure 2:
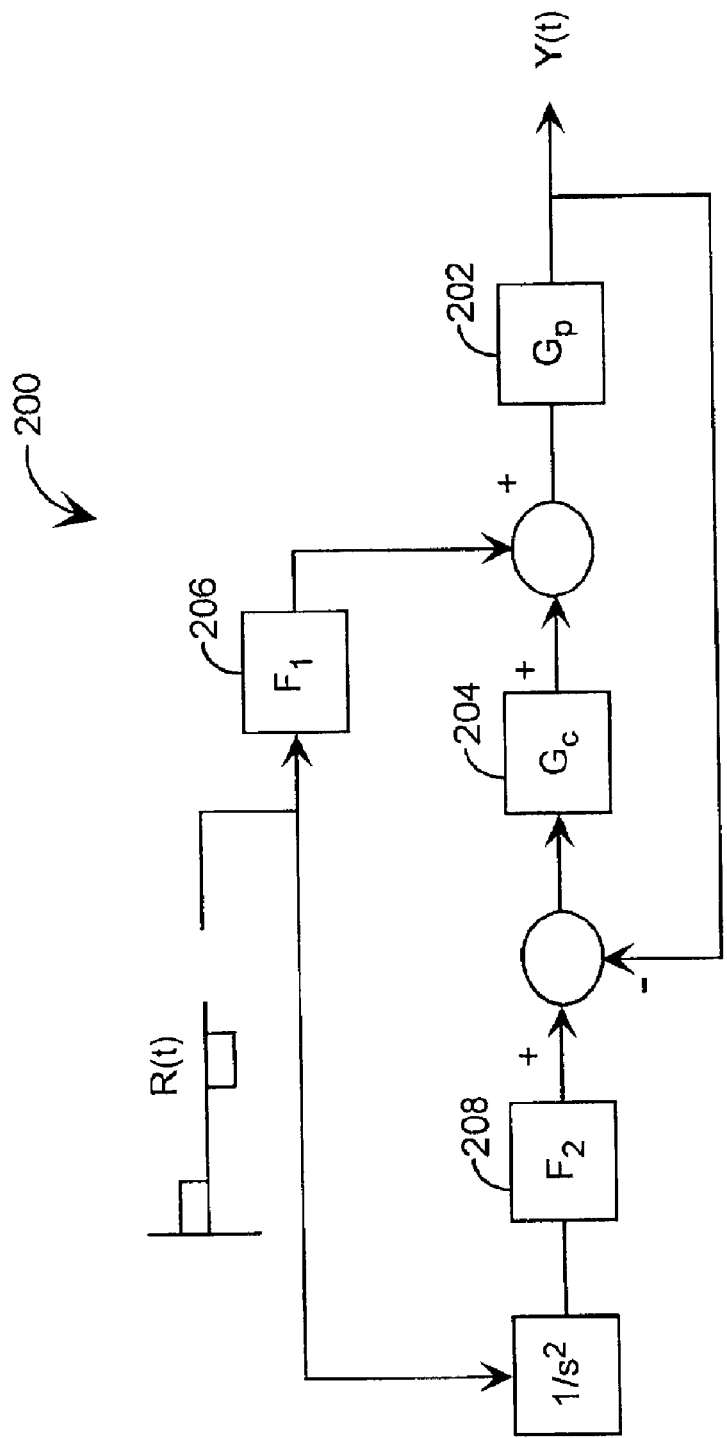
FIG. 2 is a block diagram illustrating an exemplary closed loop control system according to the present invention.

Referring to FIG. 2, an exemplary closed loop control system 200 according to the present invention includes a plant 202, a controller 204, a feedforward input prefilter 206, and a reference input prefilter 208 configured as shown. To complement this design, an input profile that attempts to fully utilize the bandwidth of the closed loop system is provided. As shown in FIG. 2, the input comprises a bang-bang acceleration input, R(t), which is input into both the feedforward and reference paths that contain the prefilters 206 and 208, respectively. The resulting inputs have spectral content distributed over the closed loop system bandwidth and attenuated for higher frequencies.

An exemplary nominal plant 202 is given as $$G_P(s) = \left\{ \frac{1}{Js^2} + \sum_{i=1}^{N} \frac{\eta_i}{s^2 + 2\zeta_i \omega_i s + \omega_i^2} \right\} \cdot IRU(s) \cdot CMG(s) \quad (1)$$

where J is the rigid body inertia, $\eta_i$ is the $i^{th}$ flex mode modal gain, $\zeta_i$ is the $i^{th}$ flex mode damping ratio, $\omega_i$ is the $i^{th}$ flex mode modal frequency, IRU(s) represents a simplified Inertial Reference Unit (IRU) model, and CMG(s) represents a simplified Control Moment Gyro (CMG) model. An exemplary simplified model of the IRU (a sensor that detects angular acceleration of the satellite) comprises a second order transfer function. An exemplary simplified model of the CMG (an actuator that is used to rotate the satellite) also comprises a second order transfer function. Using this nominal plant, the plant template is defined by varying the nominal plant by +/−10% in each modal frequency $\omega_i$+/−10% in each modal gain $\eta_i$, and +/−3% in rigid body inertia J.

Figure 3:
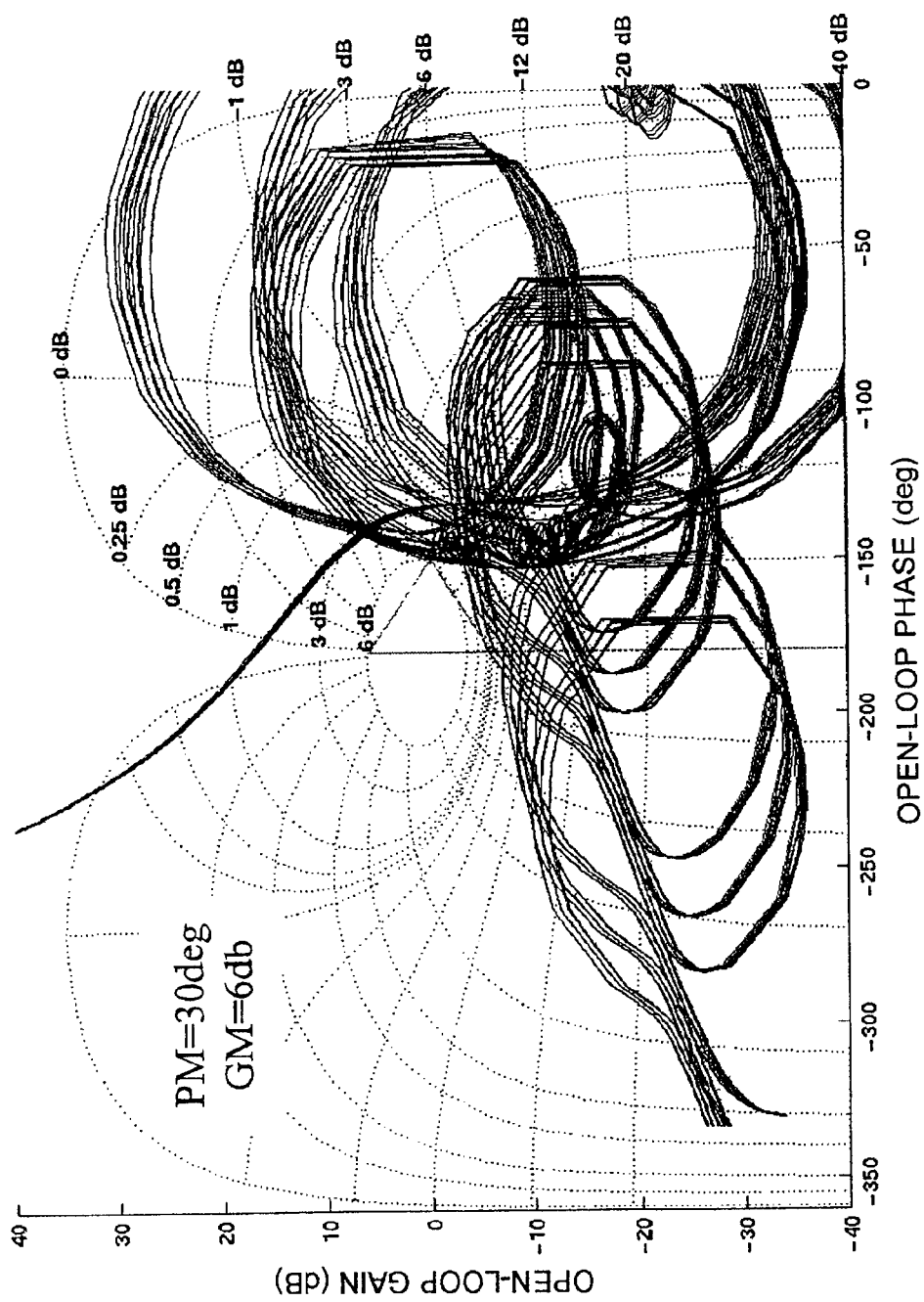
FIG. 3 is a Nichols chart displaying the frequency response for an exemplary controller design according to the present invention and a satellite model combined.

An application of the design technique of the present invention yielded the following exemplary controller 204 which, after discretization (via Tustin transform), provides 6 dB of gain margin and 30 degrees of phase margin for all plants contained in the template as shown in FIG. 3.

$$G_C(s) = \frac{0.018(s^2/0.15^2 + s \cdot 2 \cdot 0.8/0.15 + 1)}{s(s^2/3.4^2 + s \cdot 2/3.4 + 1)(s/6 + 1)(s/7 + 1)} \cdot \frac{(s^2/3.5^2 + s \cdot 2 \cdot 0.35/3.5 + 1)(s/3.7 + 1)}{1} \quad (2)$$

The Nichols chart (FIG. 3) displays the frequency response for the controller design and satellite model combined. Numerous plants are drawn because several of the satellite model's parameters are being varied (−0.2 Hz S/A ±10% Modal Freq., ±10% Modal Gain, ±3% Inertia). The chart illustrates the range of frequency responses for the satellite using the frequency responses of the family of linear models created using the theory illustrated in FIG. 1.

Because the QFT based design technique of the present invention accounts for modeling uncertainty, less conservative gain and phase margins, for example, 6 dB and 30 degrees, can be used for the nominal plant. These margins are enforced for all plants contained in the template. Therefore, in addition to enforcing the aforementioned margins, the QFT based design technique synthesized a controller based on performance specifications, plant dynamics, and modeling uncertainty. The simultaneous consideration of these constraints on the Nichols chart produced a combination of lead and lag filters forming the controller (equation 2). The resulting controller form is dictated by the design problem and is not chosen a priori.

To complement the resulting closed loop system, an input scheme designed to utilize the closed loop bandwidth is provided. The scheme is described below (in equations 3–5) and in FIG. 2, where R(t) is the system input.

$$R(t) = \partial(t) \cdot \alpha_M \text{ where } \partial(t) = \begin{cases} 1 & 0 < t \le t_1 \\ 0 & t_1 < t \le t_2 \\ -1 & t_2 < t \le t_3 \\ 0 & t_3 < t \le \infty \end{cases} \quad (3)$$

$$t_1 = \omega_L/\alpha_M, \; t_2 = (\theta - \alpha_M \cdot t_1^2 + \omega_L \cdot t_1)/\omega_L, \; t_3 = t_1 + t_2, \quad (4)$$

$$\omega_L = \omega_M \cdot \gamma \text{ where } \gamma = \begin{cases} 0.3 & 0 < \theta \le b1 \\ 0.6 & b1 < \theta \le b2 \\ 1.0 & b2 < \theta \le b3 \end{cases} \quad (5)$$

R(t) is a function of the maximum angular velocity $\omega_M$ (e.g., that a flexible structure such as a satellite can travel), maximum angular acceleration $\alpha_M$, and the slew angle $\theta$, where b1, b2, and b3 define the commanded slew regions, and $\omega_L$ is a fraction of the maximum angular velocity. It should be appreciated, however, that a different number of slew regions can be defined. In an embodiment of the present invention, the input R(t) is defined so that when integrated twice it converges to the commanded angle $\theta$, with $t_1, t_2, \ldots$ being the bang-bang points. This input scheme is designed to create an input R(t) that has broad spectral content, which is subsequently bandwidth limited via the pre-filters $F_1$ and $F_2/s^2$.

An element of this approach, which improves performance is scheduling the prefilters and R(t) as a function of commanded slew angle $\theta$. The input R(t) changes with slew angle as defined in equations 3–5. The pre-filters are modified as a function of slew angle as shown below in Table 1. Improved pointing performance is achieved because the input R(t) and prefilters $F_1$ & $F_2$ are tailored for subsets of the total operating range.

in the template (variations of +/−10% modal frequency $\omega$, +/−10% modal gain $\eta$, and +/−3% inertia J). The x-axis is the commanded slew angle, the y-axis is the resulting pointing error when the satellite attempts to slew the commanded slew angle. Slew angle is normalized using the largest slew, and pointing error is normalized with the maximum allowable pointing specification. Each line represents a different plant or linear model from the family of linear models.

Although the present invention has been described in terms of the embodiment(s) above, numerous modifications and/or additions to the above-described embodiment(s) would be readily apparent to one skilled in the art. It is intended that the scope of the present invention extends to all such modifications and/or additions.

I claim:

1. A method of controlling pointing for a flexible structure, comprising:
   providing feedforward and reference inputs of a pointing control system with prefilters; and
   scheduling the prefilters and a bang-bang input to the pointing control system as a function of a desired input.

2. The method of controlling pointing for a flexible structure of claim 1, wherein the prefilters filter the bang-bang input such that modes associated with flexibility of the structure are not excited.

3. The method of controlling pointing for a flexible structure of claim 1, wherein pole locations of the prefilters is derived from a lowest frequency mode present in dynamics of the structure.

4. The method of controlling pointing for a flexible structure of claim 1, wherein the prefilters are tailored for subsets of a total operating range.

5. The method of controlling pointing for a flexible structure of claim 1, wherein the prefilters shape the frequency content of the bang-bang input.

6. The method of controlling pointing for a flexible structure of claim 1, wherein the prefilters bandwidth limit spectral content of the bang-bang input.

7. The method of controlling pointing for a flexible structure of claim 1, wherein the prefilters are low pass.

TABLE 1

| | Prefilter Schedule | |
|---|---|---|
| | $F_1$ | $F_2$ |
| $0 < \theta \le a1$ | $\dfrac{1}{(s/0.5+1)(s/0.55+1)}$ | $\dfrac{(s/0.2+1)}{(s/0.23+1)(s/0.5+1)(s/0.55+1)}$ |
| $a1 < \theta \le a2$ | $\dfrac{1}{(s/0.5+1)(s/0.6+1)}$ | $\dfrac{(s/0.2+1)}{(s/0.22+1)(s/0.5+1)(s/0.6+1)}$ |
| $a2 < \theta \le a3$ | $\dfrac{1}{(s/0.59+1)(s/0.59+1)}$ | $\dfrac{1}{(s/0.59+1)(s/0.59+1)}$ |
| $a3 < \theta \le a4$ | $\dfrac{1}{(s/0.59+1)(s/0.59+1)}$ | $\dfrac{1}{(s/2.85+1)(s/0.59+1)(s/0.59+1)}$ |
| $a4 < \theta \le a5$ | $\dfrac{1}{(s/0.57+1)(s/0.57+1)}$ | $\dfrac{1}{(s/2.85+1)(s/0.57+1)(s/0.57+1)}$ |

Figure 4:
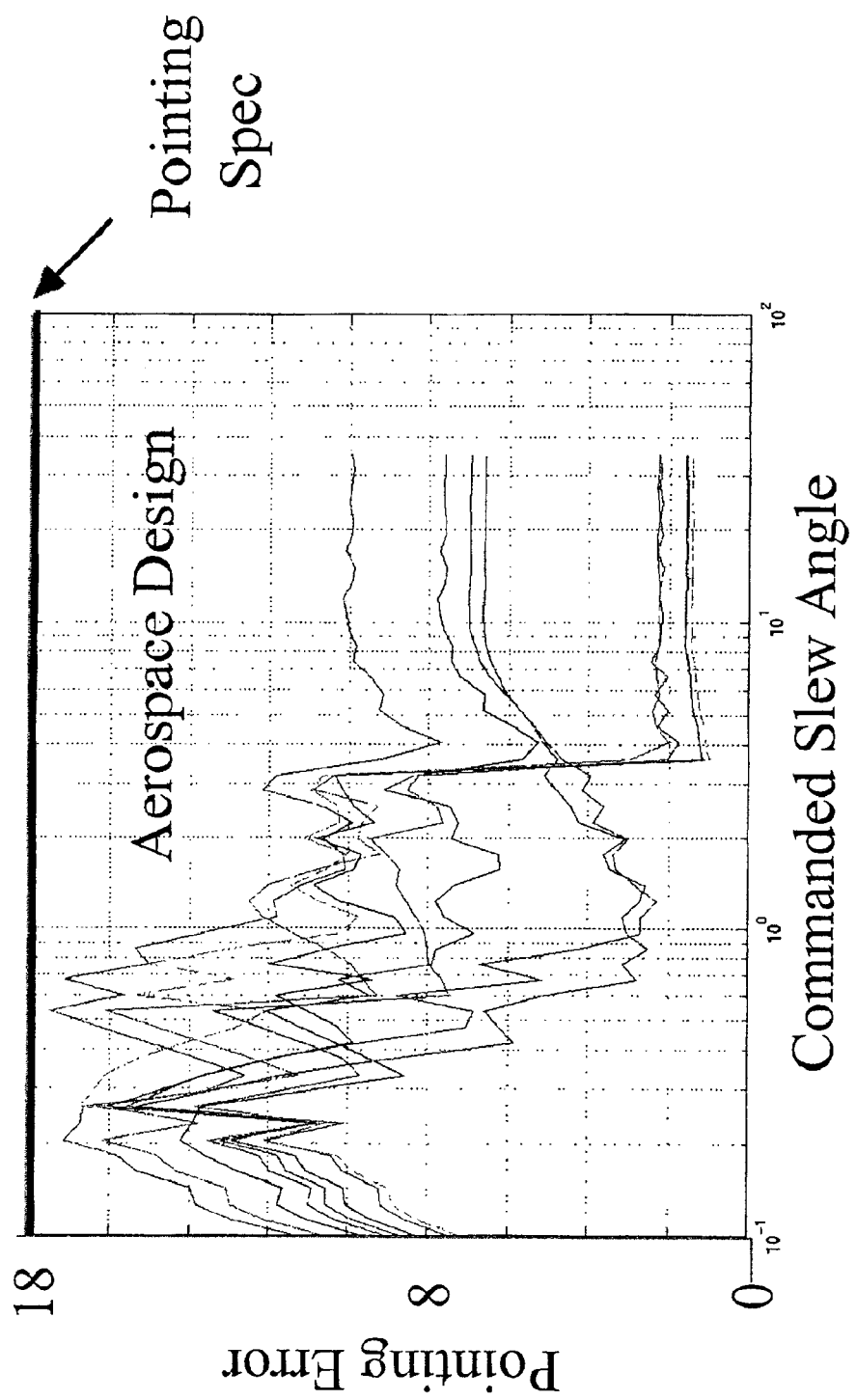
FIG. 4 shows time domain performance plotting maximum error after settling versus slew angle for all plants in a template generated according to an exemplary implementation of the present invention.

Application of the above-described exemplary controller and input scheme resulted in satisfaction of an 18 unit pointing performance specification. Actual time domain performance of the system is detailed in FIG. 4 that plots maximum error after settling versus slew angle for all plants 8. The method of controlling pointing for a flexible structure of claim 1, wherein the prefilters are modified as a function of a commanded slew angle $\theta$.

9. The method of controlling pointing for a flexible structure of claim 1, wherein the prefilters are scheduled as a function of a commanded slew angle θ.

10. The method of controlling pointing for a flexible structure of claim 1, wherein pole and zero locations of the prefilters and bang-bang profile specifics are scheduled as a function of a magnitude of an input to be tracked.

11. The method of controlling pointing for a flexible structure of claim 1, wherein pole and zero locations of the prefilters and bang-bang profile specifics are scheduled as a function of plant dynamics.

12. The method of controlling pointing for a flexible structure of claim 1, wherein the bang-bang input is scaled based on system capabilities and a magnitude of an input to be tracked.

13. A method of controlling pointing for a flexible structure, comprising:

providing a closed loop control system with feedforward and reference paths; and providing, to the feedforward and reference paths, inputs that have spectral content distributed over a closed loop bandwidth of the system.

14. The method of controlling pointing for a flexible structure of claim 13, wherein the inputs are attenuated at higher frequencies.

15. The method of controlling pointing for a flexible structure of claim 13, wherein each path includes a prefilter.

16. A method of controlling pointing for a flexible structure, comprising:

providing a closed loop control system to a flexible structure; and providing, to the closed loop control system, an acceleration command, R(t), which is a function of a maximum angular velocity $\omega_M$, a maximum angular acceleration $\alpha_M$, and a slew angle θ.

17. The method of controlling pointing for a flexible structure of claim 16, wherein the maximum angular velocity $\omega_M$ changes as a function of the slew angle θ.

18. The method of controlling pointing for a flexible structure of claim 16, wherein R(t) is defined such that when integrated twice it converges to a commanded angle.

19. A method of controlling pointing for a flexible structure, comprising:

providing a closed loop control system of a flexible structure; and providing, to the closed loop control system, a bang-bang acceleration input that takes into account uncertainty related to plant dynamics.

20. A method of controlling pointing for a flexible structure, comprising:

providing a pointing controller designed to receive bang-bang inputs and to take uncertainty related to ignorance of plant dynamics into account.

* * * * *